(12) United States Patent
Feher et al.

(10) Patent No.: US 7,335,714 B1
(45) Date of Patent: Feb. 26, 2008

(54) SULFINE CONTROL AGENTS FOR SYNTHESIZING POLYMERS

(75) Inventors: Frank James Feher, Copley, OH (US); Viswanath Mahadevan, Copley, OH (US); Dane Kenton Parker, Coshocton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/624,520

(22) Filed: Jan. 18, 2007

(51) Int. Cl.
*C08F 36/04* (2006.01)
*C08F 2/38* (2006.01)

(52) U.S. Cl. .............. 526/335; 526/222; 526/329.2; 526/346; 526/917; 525/261; 525/267

(58) Field of Classification Search ........... 526/222, 526/917, 335, 346, 329.7; 525/267, 261
See application file for complete search history.

(56) References Cited

U.S. PATENT DOCUMENTS

| 6,596,899 | B1 | 7/2003 | Lai |
| 6,992,156 | B2 | 1/2006 | Parker et al. |
| 2004/0171777 | A1 | 9/2004 | Le et al. |

FOREIGN PATENT DOCUMENTS

| JP | 2005171095 | | 6/2005 |
| WO | 9801478 | A1 | 1/1998 |
| WO | 0160792 | A1 | 8/2001 |

OTHER PUBLICATIONS

Toy et al, "Reversible Addition Fragmentation Chain Transfer (RAFT) Polymerization of Methyl Acrylate: Detailed Structural Investigation via Couples Size Exclusion Chromatography . . . ", Macromolecules 2004, 37, 744-751.*

Favier et al, "MALDI-TOF MS Investigation of the RAFT Polymerization of a Water-Soluble Acrylamide Derivative", Macromolecules 2004, 37, 2026-2034.*

Cerreta, Francesca, et al., "Chemoselective Synthesis of Aliphatic Sulfines by Direct Oxidation of Dithioesters," Bull Soc Chem Fr., 1995, vol. 132, pp. 57-74.

Chevrie, David, et al., "Oxidation of Dithiocarbamates and Synthesis of a Stable Sulfine," Tetrahedron Letters, 1998, vol. 39, pp. 8983-8986.

Kato, Von Katsuo, et al., "Die Kristall- und Molekustruktur des Primar-Oxydationsproduktes von S-(2-Methoxyphenyl)-N-(2,6-dimethylphenyl)-dithiourethan," Acata Cryst., 1972, vol. B28, pp. 2653-2658.

Lee, Albert W. M., et al., "One Pot Phase Transfer Synthesis of Trithiocarbonates from Carbon Disulphide and Alkyl Halides," Synthetic Communications, 1988, vol. 18, Issue 13, pp. 1531-1536.

Leriverend, Catherine, et al., "Thiophilic Addition of Organolithiums to Trithiocarbonte Oxides (Sulfines)," Tetrahedron, 1997, vol. 53, No. 4, pp. 1323-1342.

Marrierre, Eddie, et al., "First Synthesis of Sulfines by Direct Oxidation of Xanthates," Journal of Chemical Society, Perkin Trans., 1997, vol. 1, pp. 2019-2020.

\* cited by examiner

*Primary Examiner*—Fred Teskin
(74) *Attorney, Agent, or Firm*—Wood, Herron & Evans

(57) ABSTRACT

The present invention is directed to sulfine control agents for synthesizing polymers via controlled free radical polymerization and to the polymers resulting therefrom. Such polymers include repeat units derived from the controlled free radical polymerization, particularly reversible atom fragmentation transfer (RAFT) polymerization, of at least one vinyl-containing monomer, at least one conjugated diene monomer, or combinations thereof, in the presence of a sulfine compound having the formula:

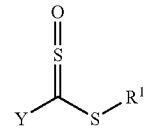

wherein $R^1$ is alkyl, cycloalkyl, substituted alkyl, heteroalkyl, heterocycloalkyl or substituted heterocycloalkyl, and wherein Y is alkyl, cycloalkyl, substituted alkyl, heteroalkyl, heterocycloalkyl, substituted heterocycloalkyl, aryl, substituted aryl, heteroaryl, substituted heteroaryl, alkoxy, amino or thio.

19 Claims, No Drawings

SULFINE CONTROL AGENTS FOR SYNTHESIZING POLYMERS

FIELD OF THE INVENTION

The present invention is directed to sulfine control agents for synthesizing polymers via controlled free radical polymerization and to the polymers resulting therefrom.

BACKGROUND OF THE INVENTION

Free radical polymerization is an important method for producing polymers from vinyl-containing monomers, conjugated diene monomers, or mixtures of either or both. Early on, free radical polymerization was accomplished via traditional radical chain processes, which provided very limited opportunities for creating polymers with rationally designed architectures. However, more recently, the discovery of techniques for inducing "living" characteristics to free-radical chain polymerization has revolutionized the field by providing methods for producing structurally well-defined polymers and copolymers. Collectively, these methods for so-called "controlled free radical polymerization" represent a powerful tool for producing polymeric structures, ranging from homopolymers with narrow molecular weight distributions to block copolymers to complex nanostructured polymer architectures. Known methods for controlled free radical polymerization include: atom transfer radical polymerization (ATRP), reversible atom fragmentation transfer (RAFT) polymerization, nitroxide-mediated polymerization (NMP), degenerative iodine transfer polymerization (DT), and diphenylethylene-mediated polymerization (DPE).

The methods for controlled free radical polymerization are based on the use of a control agent to introduce reaction pathways for reversible formation of dormant polymer chains from growing macroradicals. Under typical conditions, the equilibrium position of the reversible reaction is shifted strongly toward the dormant species, which lowers the concentration of macroradicals to the point where the rate of termination by bimolecular reactions (e.g., radical combination) is negligible compared to the rate of propagation. Each type of controlled free radical polymerization relies on a different type of control agent, and the utility of each process depends greatly on the nature of the chemical functionality created by the control agent's presence in the dormant polymer chains.

It is known to use sulfur-containing molecules, such as dithioesters, trithiocarbonates, xanthates, and derivatives of dithiocarbamates, as control agents for free radical polymerization, such as for RAFT polymerization. Many of these sulfur compounds are highly colored. To that end, the chromophores responsible for such coloring can become incorporated into the resulting polymer during free radical polymerization. This can lead to a noticeably colored polymer product, which is undesirable for many potential applications. In addition, the color-causing chromophores can participate in a number of chemical and photochemical reactions, including reactions that lead to cleavage of polymer chains.

Thus, it would be desirable to provide sulfur compounds for use as control agents for synthesizing polymers by free radical polymerization, particularly RAFT polymerization, that minimizes or overcomes the present drawbacks of current sulfur-containing control agents.

SUMMARY OF THE INVENTION

In accordance with an embodiment of the present invention, sulfine control agents are provided for synthesizing polymers via controlled free radical polymerization, such as reversible atom fragmentation transfer (RAFT) polymerization. Such polymers include repeat units that are derived from the controlled free radical polymerization of at least one vinyl-containing monomer, at least one conjugated diene monomer, or combinations thereof, and the sulfine control agents, which may be defined by the following formula:

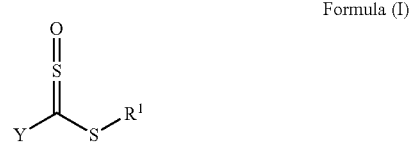

Formula (I)

wherein $R^1$ is an alkyl, cycloalkyl, substituted alkyl, heteroalkyl, heterocycloalkyl, or substituted heterocycloalkyl, and wherein Y is an alkyl, cycloalkyl, substituted alkyl, heteroalkyl, heterocycloalkyl, substituted heterocycloalkyl, aryl, substituted aryl, heteroaryl, substituted heteroaryl, alkoxy, amino, or thio. In one embodiment, Y is a thio group defined by SZ', where Z' is a substituted alkyl, such as benzyl. Derivatives and conjugates of the sulfine control agent are also contemplated.

The conjugated diene monomers can include any suitable monomer such as 1,3-butadiene ("butadiene"), 1,3-pentadiene, 2,4-hexadiene, 1,3-hexadiene, 1,3 heptadiene, 1,3-octadiene, 4,5-diethyl-1,3-octadiene, piperylene, isoprene, 2,3-dimethyl-1,3-butadiene, 2,3-diethyl-1,3-butadiene, 2,3-di-n-propyl-1,3-butadiene, 2-methyl-3-isopropyl-1,3-butadiene, 2-methyl-3-ethyl-1,3-butadiene, 2-phenyl-1,3-butadiene, 3-methyl-1,3-pentadiene, 2-ethyl-1,3-butadiene, 2-methyl-1,3-hexadiene, 3-methyl-1,3-heptadiene, 3-butyl-1,3-octadiene, or 3-n-propyl-1,3-pentadiene. In one embodiment, the conjugated diene monomer has from 4 to 20 carbon atoms.

The vinyl-containing monomer may be defined by the formula:

$$H_2C = \begin{matrix} R^2 \\ \\ R^3 \end{matrix}$$

wherein $R^2$ is H, halogen, alkyl, cycloalkyl, substituted alkyl, heteroalkyl, heterocycloalkyl, substituted heterocycloalkyl, aryl, substituted aryl, heteroaryl or substituted heteroaryl; wherein $R^3$ is H, halogen, $R^4$, $CO_2H$, $CO_2R^4$, $COR^4$, $CN$, $CONH_2$, $CONHR^4$, $CON(R^4)_2$, $O_2CR^4$, $OR^4$, $SR^4$, and wherein $R^4$ is alkyl, cycloalkyl, substituted alkyl, heteroalkyl, heterocycloalkyl, substituted heterocycloalkyl, aryl, substituted aryl, heteroaryl or substituted heteroaryl. In one example, the vinyl-containing monomer includes styrene.

In one embodiment, either or both Y and $R^1$ define polymer chains including repeat units derived from the polymerization of at least one vinyl-containing monomer, at least one conjugated diene monomer, or combinations thereof.

By virtue of the foregoing, there is thus provided sulfine control agents for synthesizing polymers via controlled free radical polymerization and polymers resulting therefrom.

DETAILED DESCRIPTION

In accordance with an embodiment of the present invention, sulfine control agents are provided for synthesizing polymers via free radical polymerization, particularly via RAFT polymerization. The sulfine control agents have the following formula:

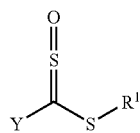

Formula (I)

wherein $R^1$ is an alkyl, cycloalkyl, substituted alkyl, heteroalkyl, heterocycloalkyl, or substituted heterocycloalkyl, and wherein Y is an alkyl, cycloalkyl, substituted alkyl, heteroalkyl, heterocycloalkyl, substituted heterocycloalkyl, aryl, substituted aryl, heteroaryl, substituted heteroaryl, alkoxy, amino, or thio. Derivatives and conjugates of the sulfine control agent are also contemplated.

The term "alkyl" is used herein to refer to a branched or unbranched, saturated or unsaturated acyclic hydrocarbon radical. Typical alkyl radicals include, for example, methyl, ethyl, n-propyl, i-propyl, 2-propenyl (or allyl), n-butyl, i-butyl, t-butyl (or 2-methylpropyl), pentyl, hexyl, vinyl (or alkenyl), alkynyl, etc. In one embodiment, alkyls have between 1 and 200 carbon atoms. In another embodiment, alkyls have between 1 and 50 carbon atoms. In yet another embodiment, alkyls have between 1 and 20 carbon atoms.

The term "cycloalkyl" refers to a saturated or unsaturated cyclic nonaromatic hydrocarbon radical having a single ring or multiple condensed or fused rings. Suitable cycloalkyls include, for example, cyclopentyl, cyclohexyl, cyclooctenyl, bicycloheptyl, etc. In one embodiment, cycloalkyls have between 3 and 200 carbon atoms. In another embodiment, cylcloalkyls have between 3 and 50 carbon atoms. In yet another embodiment, cylcloalkyls have between or 3 and 20 carbon atoms.

"Substituted alkyl" refers to an alkyl as just described in which one or more hydrogen atoms attached to carbon of the alkyl is replaced by another group, such as halogen, aryl, substituted aryl, cycloalkyl, substituted cycloalkyl, and combinations thereof. Suitable substituted alkyls include, for example, benzyl and trifluoromethyl.

"Substituted cycloalkyl" refers to a cycloalkyl as just described in which one or more hydrogen atoms attached to carbon of the cycloalkyl is replaced by another group, such as halogen, alkyl, substituted alkyl, aryl, substituted aryl, cycloalkyl, substituted cycloalkyl, heterocycloalkyl, heteroaryl, substituted heteroaryl, alkoxy, aryloxy, boryl, phosphino, amino, silyl, thio, seleno and combinations thereof. Suitable substituted cycloalkyls include, for example, 4-methoxycyclohexyl and 4,5-dibromocycloheptyl-4-enyl.

The term "heteroalkyl" refers to an alkyl as described above in which one or more carbon atoms of the alkyl is replaced by a heteroatom from the group consisting of N, O, P, B, S, Si, Se and Ge. The bond between the carbon atom and the heteroatom may be saturated or unsaturated. Thus, an alkyl substituted with a heterocycloalkyl, substituted heterocycloalkyl, heteroaryl, substituted heteroaryl, alkoxy, aryloxy, boryl, phosphino, amino, imino, silyl, thio or seleno is within the scope of the term heteroalkyl. Suitable heteroalkyls include, for example, cyano, benzoyl, 2-pyridyl, 2-furyl, $Me_3SiO(CH_2)_3CH_2$, $(c\text{-}C_6H_{11})_7Si_8O_{12}(CH_2)_2CH_2$.

The term "heterocycloalkyl" refers to a cycloalkyl radical as described, but in which one or more or all carbon atoms of the saturated or unsaturated cyclic radical are replaced by a heteroatom from the group consisting of N, O, P, B, S, Si, Se and Ge. Suitable heterocycloalkyls include, for example, piperazinyl, morpholinyl, tetrahydropyranyl, tetrahydrofuranyl, piperidinyl and pyrrolidinyl.

The term "substituted heterocycloalkyl" refers to heterocycloalkyl as just described, but in which one or more hydrogen atom to any atom of the heterocycloalkyl is replaced by another group such as a halogen, alkyl, substituted alkyl, aryl, substituted aryl, cycloalkyl, substituted cycloalkyl, heterocycloalkyl, heteroaryl, substituted heteroaryl, alkoxy, aryloxy, boryl, phosphino, amino, silyl, thio, seleno and combinations thereof. Suitable substituted heterocycloalkyl radicals include, for example, N-methylpiperazinyl, 3-dimethylaminomorpholine.

The term "aryl" refers to an aromatic substituent that may be a single aromatic ring or multiple aromatic rings, which are fused together, linked covalently, or linked to a common group such as a methylene or ethylene moiety. The common linking group may also be a carbonyl as in benzophenone or a heteroatom, such as oxygen in the case of diphenylether or nitrogen in the case of diphenylamine. The aromatic ring(s) may include phenyl, naphthyl, biphenyl, diphenylether, diphenylamine and benzophenone among others. In one embodiment, aryls have between 1 and 200 carbon. In another embodiment, aryls have between 1 and 50 carbon atoms. In yet another embodiment, aryls have between 1 and 20 carbon atoms.

The term "substituted aryl" refers to aryl as just described in which one or more hydrogen atoms attached to any carbon atoms is replaced by one or more functional groups such as alkyl, substituted alkyl, cycloalkyl, substituted cycloalkyl, heterocycloalkyl, substituted heterocycloalkyl, halogen, halogenated alkyl (e.g., $CF_3$), hydroxy, amino, phosphino, alkoxy, amino, thio and both saturated and unsaturated cyclic hydrocarbons which are fused to the aromatic ring(s), linked covalently or linked to a common group such as a methylene or ethylene moiety. The linking group may also be a carbonyl such as in cyclohexyl phenyl ketone. Examples of substituted aryls include perfluorophenyl, chlorophenyl, 3,5-dimethylphenyl, 2,6-diisopropylphenyl and the like.

The term "heteroaryl" refers to aromatic rings in which one or more carbon atoms of the aromatic ring(s) are replaced by a heteroatom(s) such as nitrogen, oxygen, boron, selenium, phosphorus, silicon or sulfur. Heteroaryl refers to structures that may be a single aromatic ring, multiple aromatic ring(s), or one or more aromatic rings coupled to one or more nonaromatic ring(s). In structures having multiple rings, the rings can be fused together, linked covalently, or linked to a common group such as a methylene or ethylene moiety. The common linking group may also be a carbonyl as in phenyl pyridyl ketone. As used herein, rings such as thiophene, pyridine, isoxazole, phthalimide, pyrazole, indole, furan, etc. or benzo-fused analogues of these rings are defined by the term "heteroaryl."

The term "substituted heteroaryl" refers to heteroaryl as just described including in which one or more hydrogen atoms to any atom of the heteroaryl moiety is replaced by another group such as a halogen, alkyl, substituted alkyl, aryl, substituted aryl, heteroaryl, substituted heteroaryl, alkoxy, aryloxy, boryl, phosphino, amino, silyl, thio, seleno and combinations thereof. Suitable substituted heteroaryl radicals include, for example, 4-N,N-dimethylaminopyridine.

The term "alkoxy" refer to the-OZ' radical, where Z' is selected from the group consisting of alkyl, substituted alkyl, cycloalkyl, substituted cycloalkyl, heterocycloalkyl, substituted heterocycloalkyl, silyl groups and combinations thereof as described herein. Suitable alkoxy radicals include, for example, methoxy, ethoxy, benzyloxy, t-butoxy, etc. A related term is "aryloxy" where Z' is selected from the group consisting of aryl, substituted aryl, heteroaryl, substituted heteroaryl, and combinations thereof. Examples of suitable aryloxy radicals include phenoxy, substituted phenoxy, 2-pyridinoxy, 8-quinalinoxy, and the like.

The term "amino" refers to the group-$NZ^1Z^2$, where each of $Z^1$ and $Z^2$ is independently selected from the group consisting of hydrogen, alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, silyl, and combinations thereof.

The term "thio" refers to the group $SZ^1$, where $Z^1$ is selected from the group consisting of hydrogen, halogen, alkyl, substituted alkyl, cycloalkyl, heterocycloalkyl, heterocyclic, aryl, substituted aryl, heteroaryl, substituted heteroaryl, alkoxy, aryloxy, amino, silyl, and combinations thereof.

The term "silyl" refers to the-$SiZ^1Z^2Z^3$ radical, where each of $Z^1$, $Z^2$, and $Z^3$ is independently selected from the group consisting of hydrogen, halogen, alkyl, substituted alkyl, cycloalkyl, heterocycloalkyl, heterocyclic, aryl, substituted aryl, heteroaryl, substituted heteroaryl, alkoxy, aryloxy, amino, silyl, and combinations thereof.

The term "boryl" refers to the-$BZ^1Z^2$ group, where each of $Z^1$ and $Z^2$ is independently selected from the group consisting of hydrogen, halogen, alkyl, substituted alkyl, cycloalkyl, heterocycloalkyl, heterocyclic, aryl, substituted aryl, heteroaryl, substituted heteroaryl, alkoxy, aryloxy, amino, silyl, and combinations thereof.

The term "phosphino" refers to the group $PZ^1Z^2$, where each of $Z^1$ and $Z^2$ is independently selected from the group consisting of hydrogen, halogen, alkyl, substituted alkyl, cycloalkyl, heterocycloalkyl, heterocyclic, aryl, substituted aryl, heteroaryl, substituted heteroaryl, alkoxy, aryloxy, amino, silyl, and combinations thereof.

The term "seleno" refers to the group SeZ', where Z' is selected from the group consisting of hydrogen, halogen, alkyl, substituted alkyl, cycloalkyl, heterocycloalkyl, heterocyclic, aryl, substituted aryl, heteroaryl, substituted heteroaryl, alkoxy, aryloxy, amino, silyl, and combinations thereof.

The term "saturated" refers to lack of double and triple bonds between atoms of a radical group such as ethyl, cyclohexyl, pyrrolidinyl, and the like. The term "unsaturated" refers to the presence one or more double and triple bonds between atoms of a radical group such as vinyl, acetylenyl, oxazolinyl, cyclohexenyl, acetyl, and the like.

In one embodiment of the sulfine control agent, Y is thio, alkoxy, aryl, or amino. In one example, aryl is phenyl. In another example, thio is defined by SZ', where Z' is a substituted alkyl. In another embodiment, Y is thio defined by SZ', where Z' is a substituted alkyl and $R^1$ is a substituted alkyl. In yet another embodiment, Y is thio defined by SZ', where Z' is benzyl and $R^1$ is benzyl. In addition, it is contemplated that the oxygen atom of the C=S=O moiety of formula (I) can be replaced by an amino as defined above to provide a C=S=$NZ^1Z^2$ moiety.

The sulfine control agents of formula (I) may be prepared via oxidation of compounds having the formula Y—C(=S)$SR^1$, where Y and $R^1$ may be defined as above. For example, reaction of compounds of the formula Y—C(=S)$SR^1$ with meta-chloroperoxybenzoic acid in methylene chloride at 0° C. affords the corresponding sulfine control agents of formula (I). Such preparation is discussed in Leriverend et al., Thiophilic Addition of Organolithiums to Trithiocarbonate Oxides (Sulfines): Synthesis of β-Oxoketene Dithioacetals, 1,4-Dicarbonyl Compounds, and Alllyl Sulfoxides. Tetrahedron. 53(4):1323-1342 (1997), the contents of which is expressly incorporated by reference herein in its entirety. Concerning color, the general appearances of sulfine control agents of formula (I) typically differ markedly when compared to thio-containing control agents of the formula Y—C(=S)$SR^1$, wherein Y and $R^1$ may be as described above. For example, one of the most common RAFT control agents, dibenzyltrithiocarbonate, i.e., Y—C(=S)$SR^1$, wherein Y is S-benzyl and $R^1$ is benzyl, is intensely colored yellow, while the sulfine control agent represented by Y—C(=S=O)$SR^1$, wherein Y is S-benzyl and $R^1$ is benzyl, is a much paler yellow color. Since the sulfine control agents become incorporated into the resulting polymer, the less intense coloring of the sulfine control agents results in a less noticeably colored and, thus, more desirable polymer product that can be used in many potential applications.

The sulfine control agents defined by formula (I), as indicated above, polymerize monomers via free radical polymerization, such as via RAFT polymerization, in a polymerization system, such as an emulsion system, to provide polymers. The polymers so formed can include repeat units of vinyl-containing monomers, conjugated diene monomers, or combinations thereof. The formation of the polymers also may be prepared by free radical polymerization using sulfine control agents of formula (I) that define macromolecular control agents, i.e., higher formula weight sulfine control agents, wherein either or both of Y and $R^1$ may be preformed polymer chains including at least one vinyl-containing monomer, at least one conjugated diene monomer, or combinations thereof.

The conjugated diene monomers used in synthesis can include any suitable monomer such as 1,3-butadiene ("butadiene"), 1,3-pentadiene, 2,4-hexadiene, 1,3-hexadiene, 1,3 heptadiene, 1,3-octadiene, 4,5-diethyl-1,3-octadiene, piperylene, isoprene, 2,3-dimethyl-1,3-butadiene, 2,3-diethyl-1,3-butadiene, 2,3-di-n-propyl-1,3-butadiene, 2-methyl-3-isopropyl-1,3-butadiene, 2-methyl-3-ethyl-1,3-butadiene, 2-phenyl-1,3-butadiene, 3-methyl-1,3-pentadiene, 2-ethyl-1,3-butadiene, 2-methyl-1,3-hexadiene, 3-methyl-1,3-heptadiene, 3-butyl-1,3-octadiene, or 3-n-propyl-1,3-pentadiene. In one embodiment, the conjugated diene monomer has from 4 to 20 carbon atoms.

The vinyl-containing monomer may be defined by the formula:

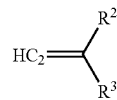

wherein $R^2$ is H, halogen, alkyl, cycloalkyl, substituted alkyl, heteroalkyl, heterocycloalkyl, substituted heterocycloalkyl, aryl, substituted aryl, heteroaryl or substituted heteroaryl; wherein $R^3$ is H, halogen, $R^4$, $CO_2H$, $CO_2R^4$, $COR^4$, CN, $CONH_2$, $CONHR^4$, $CON(R^4)_2$, $O_2CR^4$, $OR^4$, $SR^4$, and wherein $R^4$ is alkyl, cycloalkyl, substituted alkyl, heteroalkyl, heterocycloalkyl, substituted heterocycloalkyl, aryl, substituted aryl, heteroaryl or substituted heteroaryl. In one example, the vinyl-containing monomer includes styrene.

Concerning controlled free radical polymerization, and particularly RAFT polymerization, controlled polymerization by RAFT occurs via rapid chain transfer between growing polymer radicals and dormant polymer chains. More specifically, in RAFT polymerization, an initiator can produce a free radical that subsequently reacts with a polymerizable monomer. The monomer radical reacts with other monomers and propagates to form a chain, which can react with the sulfine control agent. Accordingly, the sulfine control agent becomes part of the dormant polymer chain after initiation. The sulfine control agent then can fragment, which will react with another monomer that will form a new chain or which will continue to propagate. In theory, propagation will continue until no monomer is left and a termination step occurs. After the first polymerization has finished, in particular circumstances, a second monomer can be added to the system to form a block copolymer. Such a technique can also be used to synthesize multiblock, graft, star, gradient, and end-functional polymers. The mechanistic features of RAFT are illustrated in Scheme 2 of U.S. Pat. No. 6,992,156, the contents of which is expressly incorporated by reference herein in its entirety.

The controlled free radical polymerization of monomers in the presence of the sulfine control agent is carried out in either an emulsion system or by conventional solution polymerization. In the broadest sense, an emulsion polymerization is any heterogeneous polymerization in an aqueous environment. Typically, these systems produce particles of polymer as product. Those skilled in the art recognize many variants of these polymerizations, with typical classifications distinguishing between polymerizations occurring in true emulsions, micro emulsions, mini emulsions, suspensions and dispersions. These processes are generally distinguished by differences in process, components or results, with specific factors including the presence, amount and type of surfactant required; presence, amount and type of initiator; type and amount of monomer, including monomer solubility; polymerization kinetics; temperature; order of addition of the components, including the timing of addition of the components (e.g., monomer); solubility of the polymeric product; agitation; presence of cosolvents or hydrophobes; resulting particle size; particle stability in the polymerization system toward coagulation or sedimentation; and other factors known to those skilled in the art.

With conventional or standard emulsion polymerization, the process generally involves mixing surfactant with an aqueous solution of monomer such as in the presence of a control agent. A suitable standard emulsion polymerization process is disclosed in D.C. Blackley's "Emulsion Polymerization: Theory and Practice" (Applied Science Publishers LTD, London, 1975), which is expressly incorporated by reference herein in its entirety. Suitable surfactants include any compound or mixture of compounds capable of stabilizing colloidal aqueous emulsions. A broad range of suitable surfactants, including cationic, anionic, and nonionic surfactants, is described in McCutcheon's Emulsifiers & Detergents Handbook (McCutcheon Division, Manufacturing Confectioner Publishing Co, Glen Rock, N.J., 1999).

In addition, the controlled free radical polymerization of monomers in the presence of the sulfine control agent may be specifically carried out using an in-situ emulsion polymerization process. A suitable in-situ emulsion polymerization process is disclosed in U.S. Pat. No. 6,992,156, which is expressly incorporated by reference herein in its entirety. In in-situ emulsion polymerization, the control agent generally is combined with water, surfactant, initiator (or initiating radical), and monomers, and other optional ingredients, such as an accelerator and/or a reagent(s), to react with the control agent under polymerization conditions. The initiator may be introduced into the emulsion system by many different methods. In some embodiments, the initiator may be present in either the aqueous phase or the organic phase prior to emulsification. In other embodiments, the initiator may be added to the reaction vessel after emulsification or the initiator may be generated in-situ from one or more chemical reactions occurring before, during or after the emulsification process. In some embodiments, the initiator may be added in two or more increments at different times during the polymerization. Initiation of polymerization can occur before, during, or after the emulsification procedure.

The initiator or source of initiating radicals in controlled free radical polymerization, such as RAFT polymerization, can include any suitable compound or method of generating free radicals, such as the thermally induced homolytic scission of a suitable compound(s), e.g., thermal initiators such as peroxides, peroxyesters, or azo compounds, the spontaneous generation from monomer (e.g., styrene), redox initiating systems, photochemical initiating systems or high energy radiation such as electron beam, X- or gamma-radiation, and sonication, for example. The initiating system is chosen such that under the reaction conditions there is no substantial adverse interaction of the initiator or the initiating radicals with the control agent under the conditions of the experiment. The initiator should also have the requisite solubility in the reaction medium or monomer mixture.

Thermal initiators are chosen to have an appropriate half life at the temperature of polymerization. These initiators can include one or more of the following compounds: 2,2'-azobis(isobutyronitrile), 2,2'-azobis(2-cyano-2-butane), dimethyl 2,2'-azobisdimethylisobutyrate, 4,4'-azobis(4-cyanopentanoic acid), 1,1'-azobis(cyclohexanecarbonitrile), 2-(t-butylazo)-2-cyanopropan-e, 2,2'-azobis[2-methyl-N-(1,1)-bis(hydroxymethyl)-2-hydroxyethyl]propionam-ide, 2,2'-azobis[2-methyl-N-hydroxyethyl)]-propionamide, 2,2'-azobis(N,N'-dimethyleneisobutyramidine) dihydrochloride, 2,2'-azobis(2-amidinopropane) dihydrochloride, 2,2'-azobis(N,N'-dimethylen-eisobutyramine), 2,2'-azobis(2-methyl-N-[1,1-bis(hydroxymethyl)-2-hydroxye-thyl]propionamide), 2,2'-azobis(2-methyl-N-[1,1-bis(hydroxymethyl)ethyl]propionamide), 2,2'-azobis[2-methyl-N-(2-hydroxyethyl)propionamide], 2,2'-azobis(isobutyramide)dihydrate, 2,2'-azobis (2,2,4-trimethylpentane), 2,2'-azobis(2-methylpropane), t-butyl peroxyacetate, t-butyl peroxybenzoate, t-butyl peroxyoctoate, t-butyl peroxyneodecanoate, t-butylperoxy isobutyrate, t-amyl peroxypivalate, t-butyl peroxypivalate, di-isopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, or dicumyl hyponitrite, for example.

Photochemical initiator systems can be chosen to have the requisite solubility in the reaction medium or monomer mixture and have an appropriate quantum yield for radical production under the conditions of the polymerization. Examples include benzoin derivatives, benzophenone, acyl phosphine oxides, and photo-redox systems.

Redox initiator systems are chosen to have the requisite solubility in the reaction medium or monomer mixture and have an appropriate rate of radical production under the conditions of the polymerization; these initiating systems can include combinations of oxidants and reductants. In one example, the oxidants may be selected form potassium peroxydisulfate, hydrogen peroxide, or t-butyl hydroperoxide and the reductants selected from iron (II), titanium (III), potassium thiosulfite, or potassium bisulfite.

Suitable surfactants include any compound or mixture of compounds capable of stabilizing colloidal aqueous emulsions. Generally, surfactants are amphiphilic molecules that reduce the surface tension of liquids, or reduce interfacial tension between two liquids or a liquid and a solid. Surfactants may be small molecules or polymers, micelle-forming or non-micelle-forming, and may be anionic, cationic, zwitterionic or nonionic. In some embodiments of the present invention, mixtures of surfactants are used. The amount of surfactant used typically ranges from about 0.01% to about 200% by weight relative to the monomer. In one embodiment, the amount of surfactant used ranges from about 0.1% to about 8% by weight. In another embodiment, the amount of surfactant used ranges from about 0.5% to about 3% by weight. Those skilled in the art typically consider a number of factors when selecting surfactants for a particular application, including economic factors.

Suitable anionic surfactants include substituted or unsubstituted hydrocarbyl sulfates, sulfonates, carboxylates, phosphonates and phosphates having between 6 and 30 carbon atoms per anionic functional group. Suitable cationic surfactants include substituted or unsubstituted hydrocarbyl ammonium salts having between 6 and 30 carbon atoms per cationic functional group. Suitable nonionic surfactants include amphiphilic amides having between 6 and 30 carbon atoms for each hydrocarboyl group and between 2 and 30 carbon atoms for each hydrocarbyl amine group. For each surfactant, one or more hydrogen or carbon atom from the hydrocarbyl groups may have replaced with another atom selected from the group consisting of N, S, O, Si, F, Cl, Br and I. The hydrocarbyl may also have one or more hydrogen or carbon atom replaced with a functionality such as a keto, ester, amide, ether, thioether, hydroxyl and the like, and the hydrocarbyl may be part of a ring structure.

The surfactant may be synthesized in-situ during emulsification, which can be performed by mixing a solution containing latent surfactant and at least one monomer with an aqueous solution of surfactant activator. "Latent surfactant" refers to a compound or mixture of compounds that: (i) is soluble in a monomer-containing solution that is not miscible with water; and (ii) is not independently capable of producing a stabilized colloidal microemulsion at conventional surfactant levels from simple gentle mixing of the compound or mixture of compounds with monomer-containing solution and water. The term "surfactant activator" is used herein to describe a compound or mixture of compounds that: (i) is soluble in water; and (ii) is not independently capable of producing a stabilized colloidal microemulsion at conventional surfactant levels from simple gentle mixing of the compound or mixture of compounds with monomer-containing solution and water. For the present invention, water can be a reactant for in-situ emulsification reactions, but water alone cannot be the surfactant activator. In any case, the emulsifier is synthesized by reacting the "latent surfactant" with the "surfactant activator" within the aqueous medium (in-situ within the aqueous polymerization medium). The sulfine control agent and initiator may be present in either or both solutions before mixing, or they may be generated in-situ during emulsification, or they may be added after emulsification.

In some embodiments, the surfactant for controlled polymerization may be produced by an acid/base neutralization reaction at the monomer/water interface. For some types of anionic surfactants, this may be accomplished, for example, via reaction of a monomer-soluble acid with an aqueous base, where the monomer-soluble acid is the latent surfactant and the base is the surfactant activator for in-situ emulsification. Suitable monomer-soluble acids include, for example, palmitic acid, oleic acid, dodecylbenzene sulfonic acid, lauryl sulfate, hexadecylsulfonic acid, dihexadecylphosphonic acid, hexadecylsuccinate half ester, and the monohexadecylamide of succinic acid. Suitable bases include, for example, hydroxides, carbonates and bicarbonates of alkali metal ions and quaternary ammonium ions, substituted and unsubstituted amines, and basic nitrogen-containing heterocycles. It will be evident to those skilled in the art that any aqueous base with a $pK_b$ less than about the $pK_a$ of the monomer-soluble acid also may be suitable. It also will be evident that hydroxides generated in-situ via hydrolysis of moisture-sensitive compounds, such as sodium methoxide, sodium amide, potassium hydride and the like, also may be suitable as surfactant activators.

For some types of cationic surfactants, in-situ synthesis during emulsification may be accomplished, for example, via reaction of a monomer-soluble base with an aqueous acid, where the monomer-soluble base is the latent surfactant and the acid is the surfactant activator. Suitable monomer-soluble bases include, for example, hexadecyldimethylamine, hexadecyldimethylamine oxide, and amphiphilic nitrogen-containing heterocycles. Suitable acids include for example mineral acids, sulfonic acids and phosphonic acids. It will be evident to those skilled in the art that any aqueous acid with a $pK_b$ less than about the $pK_a$ of the monomer-soluble base also may be suitable. It also will be evident that acids generated in-situ via hydrolysis of moisture-sensitive compounds, such as Lewis acids, acyl halides, acyl anhydrides, mineral acid anhydrides, hydrolyzable transition-metal halides, main group halides and the like, also may be suitable as surfactant activators.

The surfactant to monomer ratio may be controlled and can be in the range from about 0.0001:1 to about 2:1. In one embodiment, the surfactant to monomer ratio is in the range from about 0.001:1 to about 0.2:1. In another embodiment, the surfactant to monomer ratio is in the range from about 0.01:1 to about 0.1:1. Once emulsions are formed by in-situ surfactant synthesis, the surfactant to monomer ratio may be adjusted further by adding additional surfactant, which may be the same surfactant or a different surfactant that is not necessarily synthesized in-situ.

The emulsion polymerization of the monomers in the presence of the sulfine control agent is conducted for a length of time sufficient to permit substantially complete polymerization of monomers. In other words, the polymerization is normally carried out until high conversions are attained. The polymerization temperature utilized can vary over a broad temperature. Generally, the emulsion polymerization conditions are a temperature below about 95° C. The polymerizations can be carried out utilizing batch, semi-continuous or continuous techniques, as known to those having ordinary skill in the art.

After polymerization has been completed, the polymer can be recovered from the system. For some applications, the polymers may be used in the heterogeneous medium in which they are created; in others, the polymers may be isolated from the emulsion. Polymers may be isolated using a variety of well-known techniques, including, for example, coating, drying, spray drying, coagulation (i.e., with salt, solvent, thermal cycling, shear, etc.), extraction with solvent, chemical modification of the polymer and the like, depending on the application. Modifiers, stabilizers or other additives may be added to the polymers for particular applications, whether in emulsion or not, as is known to those of skill in the art.

The controlled free radical emulsion polymerizations can provide a high degree of control over molecular weight, particularly at high molecular weight, as high as >50,000 or even >100,000, often with narrow molecular weight distribution wherein polydispersity ($M_w/M_n$) may be less than 4, such as for example, between 1.1 and 2.0.

With solution polymerization, like emulsion polymerization, controlled free radical polymerization is generally initiated by adding a radical initiator to a polymerization medium, or premix, containing the monomers to be polymerized. The sulfine control agent also is added to the mixture. The radical initiator can be any suitable initiator as listed above. In one embodiment, the initiator is azobisisobutyronitrile (AIBN).

The solution polymerizations are typically carried out in a hydrocarbon solvent, such as one or more aromatic, paraffinic or cycloparaffinic compounds, as well as other organic solvents that do not terminate (or interfere with) the propagating polymer chain. The solvents generally will contain from 1 to 20 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, and petroleum naphtha, alone or in admixture. In the solution polymerizations, there typically will be from about 5 to about 30 weight percent monomers in the polymerization medium. Such polymerization media are comprised of the organic solvent and monomers. In another example, the polymerization medium may contain from about 10 to about 25 weight percent monomers. In yet another example, the polymerization medium can contain about 15 to about 20 weight percent monomers.

The solution polymerization is conducted for a length of time sufficient to permit substantially complete polymerization of monomers. In other words, the polymerization is normally carried out until high conversions are attained. The polymerization temperature utilized can vary over a broad temperature range of from about 20° C. to about 180° C. In another example, a temperature within the range of about 40° C. to about 120° C. can be utilized. In yet another example, the polymerization temperature can be within the range of about 70° C. to about 100° C. The pressure used will normally be sufficient to maintain a substantially liquid phase under the conditions of the polymerization reaction. The polymerizations can be carried out utilizing batch, semi-continuous or continuous techniques, as known to those having ordinary skill in the art.

After the polymerization has been completed, the polymer can be recovered from the organic solvent. The polymer can be recovered from the organic solvent and residue by means such as decantation, filtration, centrification, and others known to those having ordinary skill in the art. It can be desirable to precipitate the polymer from the organic solvent by the addition of lower alcohols containing from about 1 to about 4 carbon atoms to the polymer solution. Suitable lower alcohols for precipitation of the segmented polymer from the polymer cement include methanol, ethanol, isopropyl alcohol, normal-propyl alcohol and t-butyl alcohol. The utilization of lower alcohols to precipitate the polymer from the polymer cement also "kills" or terminates the living polymer by inactivating lithium end groups of the organolithium amine initiator compound. The polymerization can also be terminated with other conventional noncoupling types of terminators, such as water, an acid, a coupling agent, or other reagents that can form stable bonds with organic free radicals, for example. After the polymer is recovered from the solution, steam-stripping can be employed to reduce the level of volatile organic compounds in the polymer.

The ratios of components (e.g., initiators, surfactants, monomers, control agents, etc.) in the polymerization systems, emulsion and solution polymerization, can be important and vary widely depending on the particular embodiment being practiced. The ratio of monomer to control agent can be used to determine the molecular weight of polymers produced using the controlled emulsion or solution polymerization processes of this invention. According to these processes, the number average molecular weight of the resulting polymers depends linearly on the number of polymer chains in the polymerization and the mass of monomer. Assuming every growing chain contains one residue derived from the control agent, the selection of a monomer to control agent ratio provides an opportunity to control in advance the polymer molecular weight (or degree of polymerization). However, the actual molecular weight may differ from the predicted molecular weight by a relatively constant percentage, and this difference should be taken into account when targeting a product with a desired molecular weight. In one embodiment, the monomer to sulfine control agent ratio may be in the range from about 10:1 to about 10,000:1. In another embodiment, the monomer to sulfine control agent ratio may be in the range from about 50:1 to about 10,000:1. In another embodiment, the monomer to sulfine control agent ratio may be in the range from about 100:1 to about 5000:1.

Another ratio that may be important is the ratio of equivalents of initiator to control agent. For controlled polymerization via transfer mechanisms, such as RAFT, only catalytic amounts of initiator are required, in principle, to achieve complete conversion. In practice, initiator efficiencies vary greatly and it often may be desirable to adjust the initiator to sulfine control agent ratio to achieve desirable results.

The resulting polymers so synthesized may be block copolymers that have been assembled by the sequential addition of different monomers or monomer mixtures to living polymerization reactions. The combination of heterogeneous (and particularly emulsion) conditions with living-type polymerization kinetics provides a high degree of control over the composition, architecture, phase morphology and microstructure of polymers produced according to the invention. The current methods also may be practiced to form new polymers, including, for example, di-, tri-, poly-, multi-arm, star and graft block copolymers, as well as core-shell polymers, in addition to homopolymers. These methods further may be practiced to form a broad range of cross-linked polymer networks, interpenetrating polymer networks and polymer-modified surfaces, including polymer networks and polymer-modified surfaces with nanometer-scale dimensions.

Non-limiting examples of the use of sulfine compounds as control agents for synthesizing polymers in accordance with the description are now disclosed below. These examples are merely for the purpose of illustration and are not to be regarded as limiting the scope of the invention or the manner in which it can be practiced. Other examples will be appreciated by a person having ordinary skill in the art. Unless specifically indicated otherwise, parts and percentages are given by weight.

Preparation of Sulfine Control Agents

Dibenzyltrithiocarbonate (DBTTC) was prepared by the uneventful reaction of $[CS_3]^{-2}$ dianion with benzyl bromide according to the procedure described in Lee, et al. (Synth Commun. 1988, 18, 1531), the contents of which is expressly incorporated by reference herein in its entirety. The sulfine control agent (1) was prepared by the oxidation of DBTTC according to the procedure described by Chevrie, et al (Tetrahedron Lett. 1998, 39, 8983,) the contents of which is expressly incorporated by reference herein in its entirety

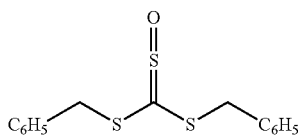

1

EXAMPLE 1

Emulsion polymerization of styrene controlled by the sulfine control agent (1).

To a mixture of sulfine control agent 1 (0.295 g, 0.96 mmol), styrene (20.0 g, 192 mmol), and oleic acid (2.76 g, 9.78 mmol) was added to a solution of potassium phosphate ($K_3PO_4$) (2.14 g, 10 mmol), potassium peroxydisulfate ($K_2S_2O_8$) (1.06 g, 3.93 mmol) and potassium hydroxide (KOH) (0.657 g, 11.7 mmol) in 100 mL water. An emulsion formed immediately. The above mixture was shaken at 70° C. for 2.5 h resulting in a stable latex with little to no flocculation (>95% conversion, $M_n$=49,600; PDI=1.28).

EXAMPLE 2

Two-stage emulsion polymerization of styrene controlled by the sulfine control agent (1).

To a mixture of the sulfine control agent (0.2 g, 0.65 mmol), styrene (13.4 g, 129 mmol), and oleic acid (1.63 g, 5.8 mmol) was added a solution of $K_3PO_4$ (1.54 g, 7.3 mmol), $K_2S_2O_8$ (0.4 g, 1.48 mmol) and KOH (0.43 g, 7.7 mmol) in 50 mL water. An emulsion formed immediately. The mixture was shaken at 70° C. for 1.0 h resulting in a stable latex with little or no flocculation (>95% conversion, $M_n$=53,000; PDI=1.3). To this solution, more styrene (18 g, 173 mmol) was added and the latex was shaken at 70 C for 2.0 h (>95% conversion, $M_n$=126,000, PDI=1.64). Since $M_n$ increased from 53,000 to 126,000, or a factor of 2.38, as the total amount of styrene increased from 13.4 to 31.4 g, or a factor of 2.34, this is indicative of controlled free radical polymerization and a "living" system.

EXAMPLE 3

Two-stage emulsion polymerization of styrene and n-butyl acrylate controlled by sulfine control agent (1).

To a mixture of sulfine control agent (1) (0.3 g, 0.98 mmol), styrene (22 g, 211 mmol), and oleic acid (1.6 g, 5.7 mmol) was added a solution of $K_3PO_4$ (2.26 g, 10.7 mmol), $K_2S_2O_8$ (1.31 g, 4.85 mmol) and KOH (1.433 g, 25.5 mmol) in 100 mL water. An emulsion formed immediately. The above mixture was shaken at 70° C. for 1.0 h resulting in a stable latex with little or no flocculation (>95% conversion, $M_n$=53,500; PDI=1.4). To this solution, n-butyl acrylate (27.7 g, 216 mmol) was added and the latex was shaken at 70° C. for 2.0 h to give a block copolymer in >95% overall yield. The ability to make block copolymers by sequential polymerization of two different monomers is indicative of controlled free radical polymerization and a "living" system.

EXAMPLE 4

Solution polymerization of styrene controlled by sulfine control agent (1).

A solution of the sulfine control agent (0.12 g, 0.39 mmol), styrene (5.3 g, 51 mmol) and azobisisobutyronitrile (AIBN) (0.10 g, 0.61 mmol) in toluene (10 ml) was heated at 70° C. for 1 hr. Polymer was precipitated by addition of methanol, collected by filtration and air-dried. Conversion was >90% and GPC analysis indicated $M_n$=8500 and PDI=1.4, consistent with "living"-type radical polymerization rather than conventional uncontrolled free-radical polymerization.

EXAMPLE 5

Solution polymerization of styrene controlled by a macromolecular sulfine control agent.

A typical RAFT polymer was produced by heating a solution of DBTTC (0.30 g, 1.03 mmol) and styrene (2.15 g, 20.7 mmol) at 120° C. GPC analysis of the resulting polymer indicated $M_n$=1,370 and PDI=1.17. Both a yellow color and 13C NMR spectrum of this polymer (which showed resonances characteristic of C=S groups) were consistent with a polymer containing trithiocarbonate functionality derived from DBTTC. This polymer was further reacted with m-chloroperbenzoic acid (2 molar equiv) under the same conditions used to prepared sulfine (1) from DBTTC ($CH_2Cl_2$, 0° C., 30 min). The color changed from yellow to very pale yellow in a manner analogous to the color change observed during oxidation of DBTTC to sulfine (1). After work-up, the resulting polymer had $M_n$=1,340 and PDI=1.18. A 13C NMR spectrum showed the resonance for C=S=O (~180 ppm) and no resonances attributable to unreacted C=S. These results are consistent with formation of a macroinitiator containing sulfine functionality. Addition of more styrene (2.15 g) and heating overnight at 70° C. in the presence of a catalytic amount of AIBN produced a new polymer with $M_n$=2900 and PDI 1.4. Overall, these results are consistent with the formation and use of a macromolecular sulfine control agent to achieve "living"-type radical polymerization of styrene rather than conventional uncontrolled free-radical polymerization.

While the present invention has been illustrated by the description of embodiments, and while the illustrative embodiments have been described in considerable detail, it is not the intention of the inventors to restrict or in any way limit the scope of the appended claims to such detail. Additional advantages and modifications readily will appear to those skilled in the art. The invention in its broader aspects is therefore not limited to the specific details, representative apparatus and methods, and illustrative examples shown and described. Accordingly, departures may be made from such details without departing from the scope of the inventors' general inventive concept.

What is claimed is:

1. A polymer comprising:
repeat units derived from controlled free radical polymerization of at least one vinyl-containing monomer, at least one conjugated diene monomer, or combinations thereof, and a sulfine control agent having the formula:

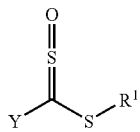

wherein $R^1$ is alkyl, cycloalkyl, substituted alkyl, heteroalkyl, heterocycloalkyl or substituted heterocycloalkyl, and wherein Y is alkyl, cycloalkyl, substituted alkyl, heteroalkyl, heterocycloalkyl, substituted heterocycloalkyl, substituted aryl, heteroaryl, substituted heteroaryl, alkoxy, amino, or thio.

2. The polymer of claim 1 wherein Y is selected from thio, alkoxy, or amino.

3. The polymer of claim 1 wherein Y is thio.

4. The polymer of claim 1 wherein the repeat units are derived from reversible atom fragmentation transfer (RAFT) polymerization of the one vinyl-containing monomer, the one conjugated diene monomer, or combinations thereof, and the sulfine control agent.

5. The polymer of claim 1 wherein the conjugated diene monomer has from 4 to 20 carbon atoms and the vinyl-containing monomer has the formula:

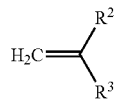

wherein $R^2$ is H, halogen, alkyl, cycloalkyl, substituted alkyl, heteroalkyl, heterocycloalkyl, substituted heterocycloalkyl, aryl, substituted aryl, heteroaryl or substituted heteroaryl; wherein $R^3$ is H, halogen, $R^4$, $CO_2H$, $CO_2R^4$, $COR^4$, CN, $CONH_2$, $CONHR^4$, $CON(R^4)_2$, $O_2CR^4$, $OR^4$, $SR^4$, and wherein $R^4$ is alkyl, cycloalkyl, substituted alkyl, heteroalkyl, heterocycloalkyl, substituted heterocycloalkyl, aryl, substituted aryl, heteroaryl or substituted heteroaryl.

6. The polymer of claim 1 wherein either or both Y and $R^1$ define polymer chains including repeat units derived from the polymerization of at least one vinyl-containing monomer, at least one conjugated diene monomer, or combinations thereof.

7. The polymer of claim 1 wherein the polymer defines a block polymer that is prepared by sequential addition of the same or different monomers or mixtures of monomers.

8. A polymer comprising:
repeat units derived from the controlled free radical polymerization of at least one vinyl-containing monomer, at least one conjugated diene monomer, or combinations thereof, and a sulfine control agent having the formula:

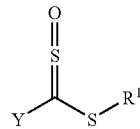

wherein $R^1$ is alkyl, cycloalkyl, substituted alkyl, heteroalkyl, heterocycloalkyl or substituted heterocycloalkyl, and wherein Y is a thio group defined by SZ', where Z' is a substituted alkyl.

9. The polymer of claim 8 wherein $R^1$ is substituted alkyl.

10. The polymer of claim 9 wherein the substituted alkyl of both Z' and $R^1$ is benzyl.

11. A method comprising:
controlled free radical polymerization of at least one vinyl-containing monomer, at least one conjugated diene monomer, or combinations thereof, in the presence of a sulfine control agent having the formula:

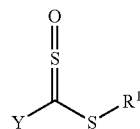

wherein $R^1$ is alkyl, cycloalkyl, substituted alkyl, heteroalkyl, heterocycloalkyl or substituted heterocycloalkyl; wherein Y is alkyl, cycloalkyl, substituted alkyl, heteroalkyl, heterocycloalkyl, substituted heterocycloalkyl, aryl, substituted aryl, heteroaryl, substituted heteroaryl, alkoxy, amino or thio.

12. The method of claim 11 wherein Y is selected from thio, alkoxy, aryl, or amino.

13. The method of claim 11 wherein Y is thio, which is defined by SZ', where Z' is a substituted alkyl.

14. The method of claim 13 wherein $R^1$ is substituted alkyl.

15. The method of claim 14 wherein the substituted alkyl of both Z' and $R^1$ is benzyl.

16. The method of claim 11 wherein the repeat units are derived from reversible atom fragmentation transfer (RAFT) polymerization of the one vinyl-containing monomer, the one conjugated diene monomer, or combinations thereof, in the presence of the sulfine control agent and an initiator.

17. The method of claim 11 wherein the conjugated diene monomer has from 4 to 20 carbon atoms and the vinyl-containing monomer has the formula:

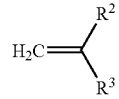

wherein $R^2$ is H, halogen, alkyl, cycloalkyl, substituted alkyl, heteroalkyl, heterocycloalkyl, substituted heterocycloalkyl, aryl, substituted aryl, heteroaryl or substituted heteroaryl; wherein $R^3$ is H, halogen, $R^4$, $CO_2H$, $CO_2R^4$, $COR^4$, CN, $CONH_2$, $CONHR^4$, $CON(R^4)_2$, $O_2CR^4$, $OR^4$, $SR^4$, and wherein $R^4$ is alkyl, cycloalkyl, substituted alkyl, heteroalkyl, heterocycloalkyl, substituted heterocycloalkyl, aryl, substituted aryl, heteroaryl or substituted heteroaryl.

18. The method of claim 11 wherein either or both Y and $R^1$ define polymer chains including repeat units derived from the polymerization of at least one vinyl-containing monomer, at least one conjugated diene monomer, or combinations thereof.

19. The method of claim 11 wherein the polymer defines a block polymer that is prepared by sequential addition of the same or different monomers or mixtures of monomers.

* * * * *

UNITED STATES PATENT AND TRADEMARK OFFICE
CERTIFICATE OF CORRECTION

| | | |
|---|---|---|
| PATENT NO. | : 7,335,714 B1 | |
| APPLICATION NO. | : 11/624520 | |
| DATED | : February 26, 2008 | |
| INVENTOR(S) | : Frank James Feher et al. | |

It is certified that error appears in the above-identified patent and that said Letters Patent is hereby corrected as shown below:

Column 3

Line 45, after "between", delete "or"

Column 4

Line 15, the first occurrence of "atom" should be --atoms--.

Line 15, after the corrected version of "atoms", insert --attached--.

Line 32, after "200 carbon", insert --atoms--.

Column 5

Line 23, "$SZ^1$" should be -- $SZ'$--.

Line 23, "$Z^1$" should be --$Z'$--.

Line 57, after "presence", insert --of--.

Column 6

Line 13, "contents" should be --content--.

Line 60, "$HC_2$" should be --$H_2C$--.

Column 7

Line 28, "contents" should be --content--.

Line 65, after "Co", insert a --.--.

Column 8

Line 45, after "hydroxyethyl", delete the ")".

Signed and Sealed this
Eleventh Day of January, 2011

David J. Kappos
*Director of the United States Patent and Trademark Office*

Column 9

Line 6, "form" should be --from--.

Line 38, after "have", insert --been--.

Column 13

Line 9, "contents" should be --content--.

Line 14, "contents" should be --content--.

Line 52, "70 C" should be --70°C--.